(12) United States Patent
Majumdar et al.

(10) Patent No.: US 11,710,099 B2
(45) Date of Patent: Jul. 25, 2023

(54) METHOD AND APPARATUS FOR AUTOMATICALLY EXTRACTING INFORMATION FROM UNSTRUCTURED DATA

(71) Applicant: JPMorgan Chase Bank, N.A., New York, NY (US)

(72) Inventors: Debraj Majumdar, Metuchen, NJ (US); Loryfel Nunez, New York, NY (US); Adam Leonard Harry Clark, Upper Saddle River, NJ (US); Jayson Lashin, Jericho, NY (US); Amish Seth, Edison, NJ (US); Noriel E. Flores, Brooklyn, NY (US); Blesson Thomas, Claymont, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 519 days.

(21) Appl. No.: 16/867,096

(22) Filed: May 5, 2020

(65) Prior Publication Data

US 2021/0350485 A1    Nov. 11, 2021

(51) Int. Cl.
| | |
|---|---|
| *G06Q 50/18* | (2012.01) |
| *G06Q 10/10* | (2023.01) |
| *G06N 20/00* | (2019.01) |
| *G06N 5/04* | (2023.01) |
| *G06F 16/25* | (2019.01) |
| *G06F 16/23* | (2019.01) |
| *G06K 9/00* | (2022.01) |

(Continued)

(52) U.S. Cl.
CPC ......... *G06Q 10/10* (2013.01); *G06F 16/2379* (2019.01); *G06F 16/258* (2019.01); *G06N 5/04* (2013.01); *G06N 20/00* (2019.01); *G06Q 50/186* (2013.01); *G06V 30/413* (2022.01); *G06V 30/414* (2022.01); *G06V 30/10* (2022.01)

(58) Field of Classification Search
CPC ...... G06V 30/10; G06V 10/40; G06V 30/414; G06V 30/413; G06N 20/00; G06N 5/003; G06F 16/258; G06F 16/2379
See application file for complete search history.

(56) References Cited

U.S. PATENT DOCUMENTS

| | | | |
|---|---|---|---|
| 8,787,681 B1 * | 7/2014 | Rubio | G06V 30/40 382/229 |
| 2019/0258854 A1 * | 8/2019 | Hosabettu | G06V 30/414 |

(Continued)

*Primary Examiner* — Liton Miah
(74) *Attorney, Agent, or Firm* — Greenblum & Bernstein, P.L.C.

(57) ABSTRACT

Various methods, apparatuses/systems, and media for automatically extracting information from unstructured data are provided. A receiver receives digitized data of a document having unstructured data format. A processor applies machine learning models for sectioning the digitized data. An OCR device applies an OCR processing to the sectioned digitized data. The processor matches the sectioned digitized data to patterns and rules; applies classification models to the matched digitized data to identify entities and events from the sectioned digitized data; automatically link each entity with corresponding event in a hierarchical format to generate a document having structured data format; and output the document having the structured data with metadata having the linked entity with corresponding event in the hierarchical format to downstream applications.

17 Claims, 22 Drawing Sheets

(51) Int. Cl.
  *G06K 9/46*  (2006.01)
  *G06V 30/413*  (2022.01)
  *G06V 30/414*  (2022.01)
  *G06V 30/10*  (2022.01)

(56) References Cited

U.S. PATENT DOCUMENTS

| | | |
|---|---|---|
| 2019/0303663 A1* | 10/2019 | Krishnapura Subbaraya ............... G06V 30/414 |
| 2019/0325211 A1* | 10/2019 | Ordonez ................. G06V 30/15 |
| 2020/0034611 A1* | 1/2020 | Hosabettu ............ G06V 30/414 |
| 2020/0159855 A1* | 5/2020 | Iyer ................... G06F 16/24522 |
| 2020/0226364 A1* | 7/2020 | Gehler ................. G06N 3/0445 |
| 2020/0279107 A1* | 9/2020 | Staar ...................... G06V 30/40 |
| 2020/0311467 A1* | 10/2020 | Srivastava ............... G06N 3/08 |
| 2020/0356363 A1* | 11/2020 | Dewitt ..................... G06F 8/75 |
| 2022/0222760 A1* | 7/2022 | Losinno ............... G06Q 50/184 |

* cited by examiner

FIG. 5

| ATTRIBUTES | MODIFICATIONS | MODIFICATIONS ARE CHANGES TO THE FOLLOWING GOVERNING INSTRUMENTS: AMENDMENT, RESTATEMENT, CODICIL, COURT ORDER, AND NON-JUDICIAL SETTLEMENT AGREEMENT. |
|---|---|---|
| ROLE | BENEFICIARY | AN INDIVIDUAL OR AN ORGANIZATION THAT ACCORDING TO THE PROVISIONS OF A TRUST IS TO RECEIVE RECURRING PAYMENTS OR OTHER FINANCIAL BENEFITS FROM THE TRUST. |
| ROLE | CO-TRUSTEE | TWO OR MORE ACCOUNT CONTROLLERS THAT JOINTLY HOLD OR ADMINISTER PROPERTY OR ASSETS FOR ANOTHER PARTY'S BENEFIT, IN ACCORDANCE WITH A TRUST AGREEMENT. THIS IS IN ACCORDANCE WITH THE KNOW YOUR CUSTOMER STANDARDS -GLOBAL. |
| ROLE | EXECUTOR/ CO-EXECUTOR | AN INDIVIDUAL APPOINTED TO ADMINISTRATE THE ESTATE OF A DECEASED PERSON / THE PERSON OR ENTITY NAMED IN A WILL OR SIMILAR INSTRUMENT WHO HAS RESPONSIBILITY FOR CARRYING OUT THE TERMS OF THE WILL OR SIMILAR INSTRUMENT. |
| ROLE | GRANTOR/SETTLOR | AN INDIVIDUAL WHO SETTLES PROPERTY ON TRUST LAW FOR THE BENEFIT OF BENEFICIARIES |
| ROLE | GUARDIAN | A PERSON WHO LOOKS AFTER AND IS LEGALLY RESPONSIBLE FOR SOMEONE WHO IS UNABLE TO MANAGE THEIR OWN AFFAIRS / A PERSON OR ENTITY IS NAMED IN A WILL, GUARDIANSHIP, OR COURT ORDER WHO IS RESPONSIBLE FOR THE CARE OF A MINOR CHILD OR INCOMPETENT ADULT. |
| ROLE | REMAINDERMAN | A PERSON WHO INHERITS OR IS ENTITLED TO INHERIT PROPERTY UPON THE TERMINATION OF THE ESTATE OF THE FORMER OWNER |

*FIG. 6*

| | | |
|---|---|---|
| ROLE | TRUSTEE | AN INDIVIDUAL OR ORGANIZATION THAT HOLDS OR ADMINISTERS PROPERTY OR ASSETS FOR THE BENEFIT OF ANOTHER PARTY IN ACCORDANCE WITH A TRUST AGREEMENT. |
| PROVISIONS | SILENT TRUST INDICATOR | INDICATOR WHICH REFLECTS INF THE BENEFICIARIES OF THE TRUST ARE SILENT OR NOT. IN THIS CASE THE BENEFICIARY DOES NOT KNOW THAT HE/SHE ARE THE BENE OF A TRUST. |
| PROVISIONS | SELF DEALING INDICATOR | (DOES THE GOVERNING INSTRUMENT INCLUDE LANGUAGE PERMITTING JPM TO DEAL WITH AFFILIATES, WAIVING THE DUTIES OF UNDIVIDED LOYALTIES AND SELF-DEALING?) |
| PROVISIONS | SPECIFIC BEQUESTS | GIFTS MADE AT THE TIME OF DEATH (WHETHER THROUGH A LAST WILL AND TESTAMENT OR A LIVING TRUST) |
| PROVISIONS | GST INDICATOR | (IS THIS TRUST/ESTATE GRANDFATHERED OR EXEMPT FROM GENERATION SKIPPING TAX?) |
| POWER | AMENDMENT | TYPICALLY A POWER RETAINED BY GRANTORS ON A REVOCABLE TRUST WHILE THEY ARE ALIVE MAY ALSO BE HELD BY A TRUST PROTECTOR |
| POWER | DISTRIBUTIONS | MAY INCLUDE AUTHORITY TO GIFT OR AUTHORITY TO CONSENT TO DISTRIBUTIONS |
| POWER | CREDIT BORROWING | AUTHORITY TO BORROW OR PLEDGE SECURITIES AS COLLATERAL. IS GENERALLY GIVEN TO A GRANTOR, EXECUTOR/CO-EXECUTOR, OR TRUSTEE/CO-TRUSTEE - BORROWING IS FOR THE BENEFIT OF THE TRUST OR THE ESTATE |
| POWER | INVESTMENTS | GENERALLY GRANTED ONLY ON A DIRECTED TRUST IN WHICH A BROKERAGE ACCOUNT HAS BEEN SET UP. |

*FIG. 6 (CONT.)*

| PARTY[1] | POWER | | | | | | | |
|---|---|---|---|---|---|---|---|---|
| | CONTRIBUTIONS | DISTRIBUTIONS | INVESTMENTS | CREDIT/ BORROWING | TAX | TRUST AMENDMENT | REMOVE/ REPLACE TRUSTEE | ASSET SUBSTITUTION |
| BENEFICIARY | X | X | X | X | X | X | X | X |
| TRUSTEE/ CO-TRUSTEE/ EXECUTOR/ CO-EXECUTOR | X | ✓ | ✓ | ✓ | ✓ | X | X | X |
| GRANTOR/SETTLOR | ✓ | ✓ | ✓ | ✓ | ✓ | ✓ | ✓ | ✓ |
| TESTATOR | ✓ | X | X | X | X | X | X | X |
| ADVISOR | X | ✓ | ✓ | ✓ | X | X | X | X |
| PROTECTOR | X | X | X | X | X | ✓ | ✓ | X |
| OUTSIDE MONEY MANAGER | X | X | ✓ | X | X | X | X | X |
| GUARDIAN | X | X | X | X | X | X | X | X |
| OTHER/INQUIRY ONLY | X | X | X | X | X | X | X | X |
| SUCCESSOR[2] | X | ✓ | ✓ | ✓ | ✓ | X | X | X |

*FIG. 7*

| DEMOGRAPHIC | PARTY | | | | |
|---|---|---|---|---|---|
| | GRANTOR/SETTLOR | TRUSTEE/ CO-TRUSTEE EXECUTOR/ CO-EXECUTOR | BENEFICIARY | PROTECTOR | GUARDIAN |
| BIRTH DATE | DD/MM/YYYY | DD/MM/YYYY | DD/MM/YYYY | DD/MM/YYYY | DD/MM/YYYY |
| AGE ATTAINMENT DATE[1] | DD/MM/YYYY | DD/MM/YYYY | DD/MM/YYYY | DD/MM/YYYY | DD/MM/YYYY |
| DATE OF DEATH | DD/MM/YYYY | DD/MM/YYYY | DD/MM/YYYY | DD/MM/YYYY | DD/MM/YYYY |

*FIG. 8*

| SIGNIFICANT EVENT | INCOME1 | | | | PRINCIPAL1 | | | |
|---|---|---|---|---|---|---|---|---|
| | CURRENT | | FUTURE | | CURRENT | | FUTURE | |
| BIRTH (SELF) | ADD | | ADD | | ADD | | ADD | |
| AGE ATTAINMENT (SELF) | ↓ | | | | ↓ | | | |
| AGE ATTAINMENT (OTHER) | ↓ | | | | ↓ | | | |
| DEATH (OTHER) | ↓ | | | | | | | |
| DEATH (SELF) | REMOVE | | REMOVE | | REMOVE | | REMOVE | |

FIG. 9

| PROVISION | STANDARDS1 | |
|---|---|---|
| | CURRENT | FUTURE |
| INCOME | E.G., HEMS; 5 AND 5 POWER | E.G., ACCUMULATION |
| PRINCIPAL | E.G., HEMS | E.G., HEMS |
| TERMINATION | E.G., DISTRIBUTION OF ALL ASSETS TO REMAINING ISSUE | E.G., DISTRIBUTION OF ALL ASSETS TO CHARITY |
| OTHER | TBD | TBD |

FIG. 10

| LABEL TYPE | SUBTYPE | LINK1 | LINK2 | PRECISION | RECALL | RAW COUNTS | NUM OF DOCS |
|---|---|---|---|---|---|---|---|
| INTERESTED PARTY | GRANTOR | | | 0.53 | 0.80 | 60 | 8 |
| | TRUSTEE | | | 0.80 | 1.00 | 8 | 8 |
| | BENEFICIARY | | | 0.24 | 1.00 | 8 | 8 |
| | | REMAINDERMAN | | 0.61 | 0.53 | 39 | 8 |
| | TRUST PROTECTOR | | | 0.66 | 1.00 | 4 | 8 |
| | DISTRIBUTION ADVISER | | | — | 1.00 | 1 | 8 |
| | INVESTMENT DIRECTION ADVISER | | | | | | |
| POWER | AMEND | | | 0.48 | 0.96 | 75 | 8 |
| | | LINK1 TEXT | | 0.71 | 1.00 | | 8 |
| | | | GRANTOR | 0.44 | 0.50 | | 8 |
| | | | PROTECTOR | 0.66 | 0.99 | | 8 |
| | DISTRIBUTION | | | 0.20 | 0.80 | | 8 |
| | | LINK1 TEXT | | 0.75 | 1.00 | | 8 |
| | | | TRUSTEE | 0.24 | 0.33 | | 8 |
| | INVESTMENT | | | 0.46 | 0.53 | | 8 |
| | | LINK1 TEXT | | 0.41 | 0.71 | | 8 |
| | | | TRUSTEE | 0.11 | 0.06 | | 8 |
| | LENDING BORROWING | | | 0.40 | 0.60 | | 8 |
| | | LINK1 TEXT | | 0.71 | 1.00 | | 8 |
| | | | TRUSTEE | 0.18 | 0.22 | | 8 |
| | REMOVE REPLACE TRUSTEE | | | 0.85 | 0.14 | | 8 |
| | | LINK1 TEXT | | 0.45 | 0.83 | | 8 |
| | | | PROTECTOR | 0.75 | 0.37 | | 8 |
| | REVOKE | | | 0.20 | 0.58 | | 8 |
| | | LINK1 TEXT | | 0.66 | 1.00 | | 8 |
| | | | GRANTOR | 0.25 | 0.50 | | 8 |
| | ALLOCATE RECEIPTS | | | 0.50 | 0.50 | | 8 |
| | | | | 0.40 | 0.66 | | 8 |
| | | LINK 1 TEXT | | 1.00 | 0.50 | | 8 |
| | | | TRUSTEE | 0.50 | 0.50 | | 8 |

FIG. 12

| ENTITY LONG NAME | STATE OF ADMINISTRATION |
| --- | --- |
| JOHN SMITH REVOCABLE TRUST AGREEMENT | CONNECTICUT |

EVENTS

- INCEPTION OF THE TRUST 🗑
- DEATH OF GRANTOR 🗑
- DEATH OF BENEFICIARY 🗑
- ROLE CHANGE TRUSTEE 🗑

ADD NEW EVENT

[_____] [ ADD ]

ROLES (INCEPTION OF THE TRUST)

▽ GRANTOR

| JOHN SMITH | ✓ 🗑 |

▽ BENEFICIARY

| CAROL SMITH | ✓ 🗑 |
| COUSIN | ✓ 🗑 |
| MAGGIE | ✓ 🗑 |
| SUSAN T. JOHNSON | ✓ 🗑 |
| WILLIAM C. SMITH | ✓ 🗑 |
| EMMA WATSON | ✓ 🗑 |

VIEWER

☑ ROLE ☑ PROVISION ☑ POWER ☑ MULTIPLE ☐ U

NAME: TESSA_DEMODOC.PDF

TIME TO TIME, TO PAY FROM THE PRINCIPAL OF THE TRUST EVEN TO THE POINT COMPLET
SUCH AMOUNTS AS THE TRUSTEES MAY LIBERALLY DEEM ADVISABLE TO PROVIDE FOR TI
TRUSTEES NEED NOT TAKE INTO CONSIDERATION ANY OTHER INCOME OR OTHER PAYME
SHALLL HAVE FROM ANY OTHER SOURCES, NOR HIS CAPITAL RESOURCES.
THE TRUSTEE SHALL MAKE EVERY EFFORT TO INVOLVE ME IN DECISION-MAKING REGAR
BEARING IN MIND THAT THE LEAST RESTRICTIVE ALTERNATIVES FOR LIVING ARRANGEME
ARTICLE, MY WIFE, WITH THE BEST AVAILABLE CARE AND SUPPORT FOR ME AND MY WIFE
ARTICLE IV - TRUST PROVISIONS AFTER DEATH OF GRANTOR
UPON MY DEATH, TRUSTEES SHALL PAY THE MY FINAL DEBTS, HIS FUNERAL EXPENSES, A
JURISDICTION, WHETHER THE PROPERTY PASSES UNDER THIS AGREEMENT MAIN BENEFI
PLAY FROM THE PRINCIPAL.
THE MARTIAL TRUST SHALL BE ALSO ESTABLISHED, ADMINISTERED AND DISTRIBUTED TO
TO HER OR APPLY FOR HER BENEFIT, SUCH AMOUNTS FROM THE NET INCOME AS THE TR
LEAST ANNUALLY.
SPECIFIC GIFTS, THE FOLLOWING WILL BE DISTRIBUTED:
(A) ONE MILLION TWO HUNDRED FIFTY THOUSAND DOLLARS ($1,250,000) TO THE GRANTOR
KLINE, OF 111 VALLEY VIEW ROAD, NORTHERN PINES, SOUTH CAROLINA 1234, THE SUM OF
(B) TWO HUNDRED FIFTY THOUSAND DOLLARS ($250,000) TO SUSAN T. JOHNSON OF 112 \
YORK, NEW YORK
(C) THREE HUNDRED THOUSAND DOLLARS ($300,000) TO THE GRANTOR'S FRIEND WILLIA
12TH ST, ARKANSAS 60091, THE SUM OF
(D) THREE HUNDRED THOUSAND DOLLARS ($300,000) TO THE GRANTOR'S FRIEND EMMA
HUNDRED THOUSAND, RESIDING IN 250 BEVERLY ROAD, PHOENIX, ARIZONA.

OCR SCORE:

STATE OF SUBSTANTIVE LAW
CONNECTICUT

PRIMARY ENTITY    ANNOTATION    REMEDIATION    REVIEW

DATA MAPPING                                          ✕

○ PROVISION | DISPOSITIVE (INCOME - DISTRIBUTION STANDARD, MANDATORY, BENEFICIARIES, FREQUENCY)

○ POWER | DISTRIBUTION AUTHORITY (TRUSTEE)

○ POWER | DISTRIBUTION AUTHORITY (TRUSTEE)

SELECT EVENTS

[INCEPTION OF THE TRUST | ✕]                    ✕ ⌄

○ ROLES    ○ POWERS    ◉ PROVISIONS            ADD

SELECT PROVISIONS

[PRINCIPAL]                                     ✕ ⌄

SELECT QUESTIONS                    SELECT ANSWER

[DOES THIS PROVISION INDICATE WHETHER THIS I... ✕ ⌄]  [DISCRETIONARY ✕ ⌄]

[ APPLY ]   [ CANCEL ]   [ DELETE ]

APPLY WILL REPLACE THE SUGGESTED ANNOTATION

⟵ FROM FIG 13    FIG. 13 (CONT.)    TO FIG 13 CONT. 2 ⟶

DATE OF TRUST

29/01/2020

PDF | TEXT

OF ANY ILLNESS OR DISABILITY. IN DETERMINING THE AMOUNT OF PRINCIPAL TO BE SO DISBURSED, THE

TO THEM. IF I AM UNABLE TO MAKE MY WISHES KNOWN, THE TRUSTEE SHALL MAKE DECISIONS THAT THE TRUSTEE BELIEVES THAT I WOULD MAKE, THE PROVISIONS BELOW IN THIS

VER BY REASON OF HIS DEATH IN RESPECT TO ALL PROPERTY REQUIRED TO BE INCLUDED IN HIS GROSS ESTATE OR LIKE TAX PURPOSES BY ANY SUCH

PERIODICALLY DIRECT, IN THE EVENT THAT SHE SHALL FAIL TO GIVE OR TO PERIODICALLY RENEW SUCH DIRECTION, THE TRUSTEES SHALL DISTRIBUTE
PERIODICALLY ADDED TO TRUST PRINCIPAL, AT

← FROM FIG 13 CONT.     *FIG. 13 (CONT.2)*

TESSA

| SELECT DOCUMENTS | ANNOTATED TEXT | FORM REVIEW |

ENTITY LONG NAME
JOHN SMITH REVOCABLE TRUST AGREEMENT

STATE OF ADMIN[I]
CONNECTICUT

EVENTS

- INCEPTION OF THE TRUST 🗑
- DEATH OF GRANTOR 🗑
- DEATH OF BENEFICIARY 🗑
- ROLE CHANGE TRUSTEE 🗑
- ADD NEW EVENT

[ ____ ] [ ADD ]

ROLES (INCEPTION OF THE TRUST)

▽ GRANTOR
- JOHN SMITH ✓ 🗑

▽ BENEFICIARY
- CAROL SMITH ✓ 🗑
- COUSIN ✓ 🗑
- MAGGIE ✓ 🗑
- SUSAN T. JOHNSON ✓ 🗑
- WILLIAM C. SMITH ✓ 🗑
- EMMA WATSON ✓ 🗑

VIEWER

☑ ROLE  ☑ PROVISION  ☑ POWER  ☑ MULTIPL[E]

NAME: TESSA_DEMODOC.PDF
ARTICLE XII - CAPTIONS...
JOHN SMITH REVOCABLE TRUST AGREEMENT
THIS AGREEMENT IS MADE THIS 30TH DAY OF JUNE, 1998 MADE BY, JOHN SMITH, AS THE GRAN[TOR]
RESIDING AT 800 BROADWAY, NEW YORK, NEW YORK, AND [JP MORGAN CHASE] AS THE TRUSTE[E]
WHEREAS, THE TRUSTEE ACCEPTS SUCH TRUST AND AGREES TO ADMINISTER IT IN ACCORDA[NCE]
TERMS AND CONDITIONS OF THIS AGREEMENT.
NOW, THEREFORE, IN CONSIDERATION OF THE MUTUAL PROMISES AND COVENANTS CONTAIN[ED]
PURPOSES AND SUBJECT TO THE TERMS AND CONDITIONS CONTAINED IN THIS AGREEMENT.
ARTICLE I - FAMILY INFORMATION
[JOHN SMITH] HAS A SPOUSE NAMED ANNE SMITH WHO SHALL BE REFERRED TO AS THE WIFE.
DAUGHTER CAROL SMITH WHO SHALL BE REFERRED TO AS THE DAUGHTER.
ARTICLE II - TRUST NAME
THIS TRUST AGREEMENT MAY BE REFERRED TO AS THE JOHN SMITH REVOCABLE TRUST AGR[EEMENT]
AMENDED AND RESTATED JOHN SMITH REVOCABLE TRUST AGREEMENT.
ARTICLE III - TRUST PROVISIONS DURING LIFETIME
THE TRUSTEES AGREE TO HOLD, ADMINISTER AND DISTRIBUTE THAT PROPERTY TOGETHER [WITH]
AND CONDITIONS HEREINAFTER SET FORTH:
[GRANTOR RESERVES THE RIGHT TO TRANSFER TO THE TRUSTEE(S) ANY ADDITIONAL PROPER[TY]]
SUBJECT IN ALL RESPECTS TO THE TERMS OF THIS TRUST AGREEMENT.
[THE TRUSTEES SHALL DISTRIBUTE TO CAROL SMITH, THE MAIN BENEFICIARY, ANNUALLY, IN O[R]]
[DISTRIBUTE TO HER OR APPLY FOR HER BENEFIT, SUCH AMOUNTS FROM THE NET INCOME AS]
ADDED TO TRUST PRINCIPAL, AT LEAST ANNUALLY.

|  | OCR SCORE: |  |
|---|---|---|
| STRATION LAW | STATE OF SUBSTANTIVE LAW |  |
|  | CONNECTICUT |  |
|  | PRIMARY ENTITY | ANNOTATION | REMEDIATION |

☐ UN-CATEGORIZED

....17

TOR,
E.
NCE WITH THE

ED IN THIS AGREEMENT, THE I HEREBY DELIVERS TO THE TRUSTEE THE PROPERTY DESCRIBED ON SCHEDULE "A" IN TRUST THAT THE GRANTOR HAS ABSOLUTELY

OHN SMITH HAS A

EMENT OR AS THE

TH ALL ADDITIONS THERETO AND REINVESTMENTS THEREOF FOR THE BENEFIT OF THE OTHER PARTIES IN ACCORDANCE WITH THE TERMS

TY AND THE RIGHT TO SUBSTITUTE OTHER PROPERTY FOR THAT AT ANY TIME HELD BY THE TRUSTEE(S), PROVIDED THAT THE PROPERTY SO SUBSTITUTED SHALL

UARTERLY, ANNUALLY OR MORE FREQUENT INSTALLMENTS, SUCH AN AMOUNT OR AMOUNTS FROM THE NET INCOME OF THE TRUST AS MAIN BENEFICIARY SHALL R
THE TRUSTEES SHALL DEEM ADVISABLE TO PROVIDE FOR HER CARE, MAINTENANCE, SUPPORT AND GENERAL WELFARE. ANY SURPLUS INCOME SHALL BE ACCUM

← FROM FIG 14    *FIG. 14 (CONT.)*    TO FIG 14 CONT. 2 →

LIGHT | DARK

STATUS ☐ SHOW RELATED TEXT

DATE OF TRUST
29/01/2020

REVIEW

PDF | TEXT

ND IRREVOCABLY TRANSFERRED TO THE TRUSTEE FOR THE FOLLOWING USES AND

E OF EQUAL VALUE TO THE PROPERTY SO REPLACED AND SUCH ADDITIONAL PROPERTY SHALL BE

ERIODICALLY DIRECT, IN THE EVENT THAT MAIN BENEFICIARY SHALL FAIL TO GIVE OR TO PERIODICALLY RENEW SUCH DIRECTION, THE TRUSTEES SHALL
LATED AND PERIODICALLY

→ FROM FIG 14 CONT.

FIG. 14 (CONT.2)

| | YEAR | STATE | SITUATION | TRANCHE | RAW COUNT (GOLD) | PRECISION | RECALL |
|---|---|---|---|---|---|---|---|
| TRUST_WEIK_XX | | | | | | 1.0 | .54 |
| TRUST_CARRI_XX | 1994 | CA | PERIOD OF YEARS | | | .75 | .75 |
| TRUST_MULF_XX | 1951 | NY | 2 SEPARATE SHARES | | | .67 | 1.0 |
| TRUST_CLARK_XX | 2014 | CT | MAIN + MARITAL | | | .65 | .59 |
| TRUST_GOES_XX | | | GENERATION SKIPPING TRUST | | | .55 | .33 |
| TRUST_MORA_XX | | | | | | .39 | .55 |
| TRUST_AI_XX | | DE | *SIMPLE* | | | .35 | 1.0 |
| TRUST_BARAS_XX | 2013 | DE | MULTI TRUST (CHILDREN) CONDITIONAL EVENTS | | | .33 | .75 |
| TRUST_VAHE_XX | | | | | | .17 | 1.0 |

*FIG. 15A*

| LABEL TYPE | SUBTYPE | LINK1 | LINK2 | PRECISION | RECALL | RAW COUNTS | NUM OF DOCS |
|---|---|---|---|---|---|---|---|
| AMEND | | ROLE (USUALLY) GRANTOR | | .83 | 1.0 | | 7 |
| REVOKE | | ROLE (USUALLY) GRANTOR | | .66 | 1.0 | | 7 |
| CREDIT BORROWING | | ROLE (TRUSTEE, INVESTMENT ADVISER) | | .83 | 1.0 | | 7 |
| DISTRIBUTION | | ROLE (TRUSTEE, DISTRIBUTION ADVISER, BENE) | | .85 | 1.0 | | 7 |
| REMOVE/REPLACE TRUSTEE | | ROLE (GRANTOR, TRUST PROTECTOR) | | .5 | 1.0 | | 7 |
| INVESTMENT | | ROLE (TRUSTEE, INVESTMENT ADVISER) | | .36 | .57 | | 7 |
| ASSET SUBSTITUTION | | ROLE (GRANTOR, TRUSTEE) | | 0 | 0 | | 7 |
| ALLOCATION OF RECIPTS BETWEEN P&I | | ROLE (TRUSTEE, DISTRIBUTION ADVISER) | | .40 | .66 | | 7 |

*FIG. 15B*

METHOD AND APPARATUS FOR AUTOMATICALLY EXTRACTING INFORMATION FROM UNSTRUCTURED DATA

TECHNICAL FIELD

This disclosure generally relates to automatic extraction of information from unstructured data, and, more particularly, to methods and apparatuses for implementing a trust and estate smart application module for interpreting the content of this unstructured data in a way that would translate it into structured data regarding the provisions, parties, and events detailed in the unstructured data, thereby providing for the automatic execution of trust and estate administration via downstream applications.

BACKGROUND

Typically, trust provisions and related party data is described in documents governing the trust relationships. This data may be key to making decisions as a Trustee and drive actions (e.g., beneficiary disbursement) based on life events (e.g., death, attaining legal rights, attaining certain age, etc.). Execution of trustee or other fiduciary responsibilities based on these life events often require multiple employees to interpret the documents, and then take the necessary actions to complete their responsibilities. Given the manual nature of interpreting and executing on the trustee or other fiduciary obligations, errors can occur, which can lead to financial and reputational issues. It may be unrealistic to expect that this data with complex linkages and relationships would be manually extractable from thousands of documents each containing a relatively large number (e.g., often more than fifty pages long) of pages without significant manual effort compounded with the risk of errors.

SUMMARY

It may be desirable to automatically extract quality data in an efficient manner that drives the key technology platforms servicing trust and estate administration without introducing business and operational risk. The present disclosure, through one or more of its various aspects, embodiments, and/or specific features or sub-components, may provide, among others, various systems, servers, devices, methods, media, programs, and platforms for implementing a trust and estate smart application module for automatically extracting information from unstructured data and automatically generating a structured data based on the extracted information thereby providing for the automated triggering of actions by multiple downstream applications that support trust and estate administration, but the disclosure is not limited thereto. In addition, the present disclosure, through one or more of its various aspects, embodiments, and/or specific features or sub-components, may further provide, among others, various systems, servers, devices, methods, media, programs, and platforms for implementing a trust and estate smart application module for automatically extracting hierarchical information of data from unstructured data to generate an structured data having limited data set compared to unstructured data using natural language processing techniques and machine learning models in a very short amount of time, i.e., within seconds, and to automatically drive trust administration which overcomes the above-described deficiencies and shortcomings, but the disclosure is not limited thereto. According to the context of the exemplary embodiments of the instant disclosure, summarizing the contents of unstructured data into a significantly reduced structured data file also help lower the storage requirements of a database.

According to an aspect of the present disclosure, a method for implementing a trust and estate smart application module for automatically extracting information from unstructured data by utilizing one or more processors and one or more memories is disclosed. The method may include: receiving digitized data of a document having unstructured data format for making domain specific corrections to the digitized data; applying machine learning models for sectioning the digitized data identifying pertinent part of the document for further analysis; applying optical character recognition (OCR) processing to the sectioned digitized data by utilizing an OCR device; matching the sectioned digitized data to patterns and rules accessed from a knowledge-based database; applying models to the matched digitized data to identify entities and events from the sectioned digitized data; automatically linking each entity with corresponding event in a hierarchical format to generate a document having structured data format; and outputting the document having structured metadata having the linked entity with corresponding event in the hierarchical format to downstream applications that automatically triggers execution of multiple platforms of the downstream applications that support trust and estate administration. According to exemplary embodiments, the models may include in-document classification models.

According to another aspect of the present disclosure, prior to matching, the method may further include: checking metadata of the received digitized data of the document by determining whether the digitized data has been processed previously, and based on a positive determination, extracting previously processed rules and heuristics associated with the metadata.

According to yet another aspect of the present disclosure, the method may further include receiving a plurality of trust and estate documents, and for each trust and estate document, the method may further include: simultaneously processing the plurality of trust and estate documents; automatically generating a structured data that indicates a linkage between each entity and its associated event for each trust and estate document; and automatically triggering execution of a plurality of platforms of downstream applications that support trust and estate administration.

According to further aspect of the present disclosure, wherein the knowledge-based database may be configured to store information including: rules and heuristics relating to trust and estate; vocabularies for language models in the field of trust and estate; entities, facts, and events that drive provisions of a trust and estate document; look-up tables having vocabularies related to trust and estate; and information relating to trust and estate training data collection, but the disclosure is not limited thereto.

According to yet another aspect of the present disclosure, the method may further include: applying the machine learning models to extract taxonomy codes as applied to the document, wherein the taxonomy codes includes roles, interested parties, powers or authority associated with a party or a role, and provisions relating to trust and estate, but the disclosure is not limited thereto.

According to an additional aspect of the present disclosure, the classification models may include: an auxiliary model that identifies whether a sentence extracted from the digitized data relates to an entity or an event governing a trust and estate document; a sentence detection model that identifies whether a sentence extracted from the digitized data is a complete sentence; and a fragment detection model that identifies whether a sentence extracted from the digitized data is an incomplete sentence or a heading, . . . but the disclosure is not limited thereto. For example, the fragment detection model may identify relevant sections of the documents for purposes of extraction.

According to yet another aspect of the present disclosure, the method may further include: persisting all entities from the metadata; for each entity, persisting all events relating to the corresponding entity; for each event, persisting all parties relating to the corresponding event; for each party, persisting all powers associated with the corresponding party; persisting all provisions associated to each entity and all the entity attributes; persisting all parties associated with the provisions; . . . transforming all persisted data into queryable format; and storing the transformed data into a database that is queryable by the downstream applications.

According to another aspect of the present disclosure, a system for implementing a trust and estate smart application module for automatically extracting information from unstructured data is disclosed. The system may include a receiver configured to receive digitized data of a document having unstructured data format for making domain specific corrections to the digitized data; a processor; and a knowledge-based database operatively connected to the processor and the receiver via a communication network. The processor may be configured to: apply machine learning models to section the digitized data identifying pertinent part of the document for further analysis; apply optical character recognition (OCR) processing to the sectioned digitized data by utilizing an OCR device; match the sectioned digitized data to patterns and rules accessed from the knowledge-based database; apply models to the matched digitized data to identify entities and events from the sectioned digitized data; automatically link each entity with corresponding event in a hierarchical format to generate a document having structured data format; and output the document having structured metadata having the linked entity with corresponding event in the hierarchical format to downstream applications.

According to further aspect of the present disclosure, prior to match, the processor may be further configured to: check metadata of the received digitized data of the document by determining whether the digitized data has been processed previously, and based on a positive determination, extract previously processed rules and heuristics associated with the metadata.

According to yet another aspect of the present disclosure, the receiver may be configured to receive a plurality of trust and estate documents and for each trust and estate document, the processor may be configured to: simultaneously process the plurality of trust and estate documents; automatically generate a structured data that indicates a linkage between each entity and its associated event for each trust and estate document; and automatically trigger execution of a plurality of platforms of downstream applications that support trust and estate administration.

According to an additional aspect of the present disclosure, the processor may be further configured to: apply the machine learning models to extract taxonomy codes as applied to the document, and wherein the taxonomy codes may include roles, interested parties, powers or authority associated with a party or a role, and provisions relating to trust and estate, but the disclosure is not limited thereto.

According to yet another aspect of the present disclosure, the processor may be further configured to: persist all entities from the metadata; for each entity, persist all events relating to the corresponding entity, for each event, persist all parties relating to the corresponding event; for each party, persist all powers associated with the corresponding party, persist all provisions associated to each entity and all the entity attributes; persist all parties associated with the provisions; transform all persisted data into queryable format; and store the transformed data into a database that is queryable by the downstream applications.

According to another aspect of the present disclosure, anon-transitory computer readable medium configured to store instructions for automatically extracting information from unstructured data is disclosed. The instructions, when executed, may cause a processor to perform the following: receiving digitized data of a document having unstructured data format for making domain specific corrections to the digitized data; applying machine learning models for sectioning the digitized data; applying optical character recognition (OCR) processing to the sectioned digitized data by utilizing an OCR device; matching the sectioned digitized data to patterns and rules accessed from a knowledge-based database; applying models to the matched digitized data to identify entities and events from the sectioned digitized data; automatically linking each entity with corresponding event in a hierarchical format to generate a document having structured data format; and outputting the document having structured metadata having the linked entity with corresponding event in the hierarchical format to downstream applications.

According to yet another aspect of the present disclosure, the instructions, when executed, may further cause the processor to perform the following prior to matching: checking metadata of the received digitized data of the document by determining whether the digitized data has been processed previously, and based on a positive determination, extracting previously processed rules and heuristics associated with the metadata.

According to an additional aspect of the present disclosure, the instructions, when executed, may further cause the processor to receive a plurality of trust and estate documents, and for each trust and estate document, the instructions, when executed, may further cause the processor to perform the following: simultaneously processing the plurality of trust and estate documents; automatically generating a structured data that indicates a linkage between each entity and its associated event for each trust and estate document; and automatically triggering execution of a plurality of platforms of downstream applications that support trust and estate administration.

According to still another aspect of the present disclosure, the instructions, when executed, may further cause the processor to perform the following: persisting all entities from the metadata; for each entity, persisting all events relating to the corresponding entity, for each event, persisting all parties relating to the corresponding event; for each party, persisting all powers associated with the corresponding party; persisting all provisions associated to each entity and all the entity attributes; transforming all persisted data into queryable format; and storing the transformed data into a database that is queryable by the downstream applications.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates tables having linked and hierarchical data in accordance with an exemplary embodiment.

FIG. 6 illustrates a table listing definitions of taxonomy codes in accordance with an exemplary embodiment.

FIG. 7 illustrates a table listing parties and power associated with each party in accordance with an exemplary embodiment.

FIG. 8 illustrates a table listing party demographics in accordance with an exemplary embodiment.

FIG. 9 illustrates a table listing party entitlements in accordance with an exemplary embodiment.

FIG. 10 illustrates a table listing trust provisions in accordance with an exemplary embodiment.

FIG. 12 illustrates a table listing scores in accordance with an exemplary embodiment.

FIG. 13 illustrates an application showing results from extracting data from a sample trust document in accordance with an exemplary embodiment.

FIG. 14 illustrates another application showing results from extracting data from a sample trust document in accordance with an exemplary embodiment.

FIG. 15A illustrates a table listing scores in accordance with an exemplary embodiment.

FIG. 15B illustrates a table listing scores in accordance with an exemplary embodiment.

DETAILED DESCRIPTION

Figure 1:
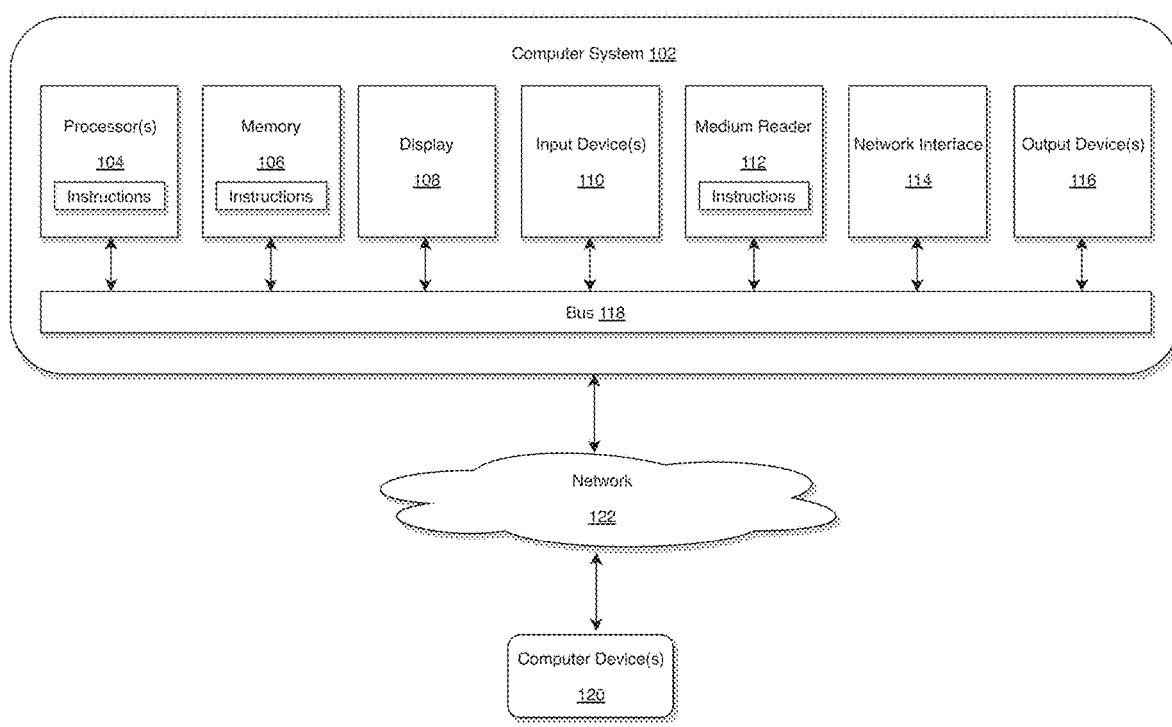
FIG. 1 illustrates a computer system for implementing a trust and estate smart device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other commination link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment . . . .

As described herein, various embodiments provide optimized processes of implementing a trust and estate smart application module for interpreting contents of unstructured data in a way that would translate it into structured data regarding provisions, parties, and events detailed in the unstructured data thereby providing for the automatic execution of trust and estate administration via downstream applications, but the disclosure is not limited thereto. As described herein, various embodiments may further provide optimized processes of implementing a trust and estate smart application module for automatically extracting hierarchical information of data from unstructured data to generate an structured data having limited data set compared to unstructured data using natural language processing techniques and machine learning models in a very short amount of time, i.e., within seconds, and to automatically drive trust administration which overcomes the above-described deficiencies and shortcomings, but the disclosure is not limited thereto. According to the context of the exemplary embodiments of the instant disclosure, summarizing the contents of unstructured data into a significantly reduced structured data file also help lower the storage requirements of a database.

Figure 2:
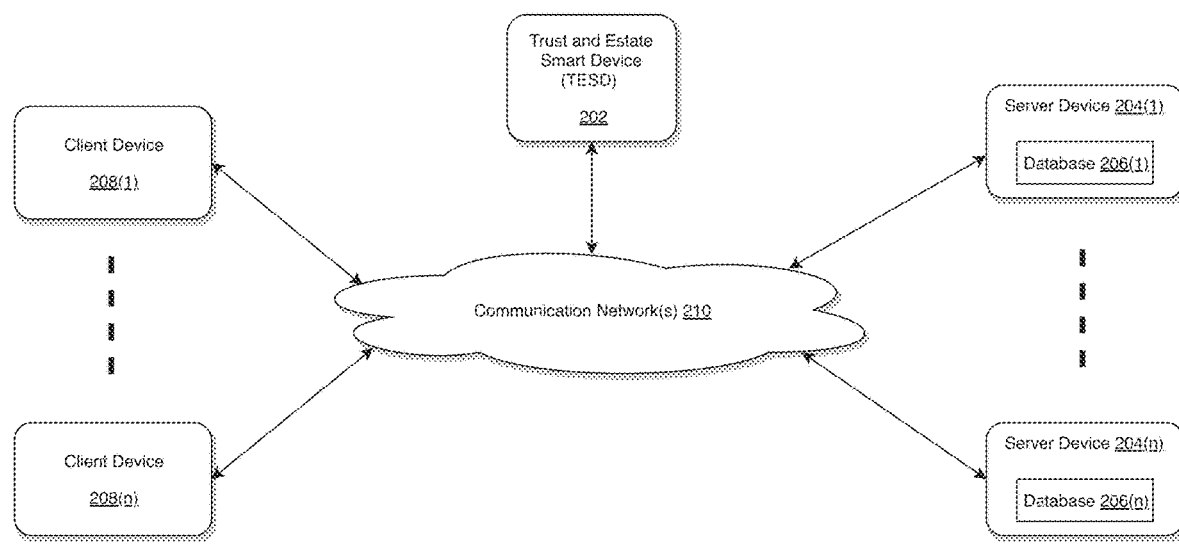
FIG. 2 illustrates an exemplary diagram of a network environment with a trust and estate smart device in accordance with an exemplary embodiment.

Referring to FIG. 2, a schematic of an exemplary network environment 200 for implementing a trust and estate smart device (TESD) of the instant disclosure is illustrated.

Conventional system, that does not implement a TESD of the instant disclosure, may not be able to automatically generate quality data in an efficient manner that drives the key technology platforms servicing trust and estate administration without introducing business and operational risk. For example, conventional OCR may just digitize the text. There may be no smartness involved in such conventional processing. In addition, conventional OCR may process data from structured documents, e.g., form-based documents (W-9, W-2 forms, or template-based legal documents, etc.). However, most trust agreements may not have any templates and be completely unstructured. For example, in traditional trust and estate documents, one may not just simply say that the beneficiary information is included within section 1, paragraph 2, etc. because of the unstructured nature of the document. Further, the provisions in one trust document may appear in places that are different than corresponding provisions appearing in another trust document. Thus, conventional system may extract a name appearing in a document, but may not link that name to a role or event (e.g., beneficiary) from the document.

According to exemplary embodiments, the above-described problems associated with conventional system may be overcome by implementing a TESD 202 having a trust and estate smart application module as illustrated in FIG. 2 by digitizing an unstructured data, extracting data, and linking it to an attribute based on application of multiple levels of artificial intelligence (AI) and machine learning (ML) models, referring to existing templates for learning and matching, but the disclosure is not limited thereto.

The TESD 202 may be the same or similar to the computer system 102 as described with respect to FIG. 1.

The TESD 202 may store one or more applications that can include executable instructions that, when executed by the TESD 202, cause the TESD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TESD 202 itself, may be located in virtual server(s) running in a cloud-based computing environment rather than being tied to one or more specific physical network computing devices. Also, the application(s) may be running in one or more virtual machines (VMs) executing on the TESD 202. Additionally, in one or more embodiments of this technology, virtual machine(s) running on the TESD 202 may be managed or supervised by a hypervisor.

In the network environment 200 of FIG. 2, the TESD 202 is coupled to a plurality of server devices 204(1)-204(n) that hosts a plurality of databases 206(1)-206(n), and also to a plurality of client devices 208(1)-208(n) via communication network(s) 210. A communication interface of the TESD 202, such as the network interface 114 of the computer system 102 of FIG. 1, operatively couples and communicates between the TESD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TESD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s)(WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TESD 202 may be a standalone device or integrated with one or more other devices or apparatuses, such as one or more of the server devices 204(1)-204(n), for example. In one particular example, the TESD 202 may be hosted by one of the server devices 204(1)-204(n), and other arrangements are also possible. Moreover, one or more of the devices of the TESD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TESD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TESD 202 that may be configured for management of identified vulnerabilities that permits a threat management group to identify and track threats that may be particularly significant to its organization, thereby efficiently generating a list of prioritized remediation and interfacing with remediation resources so that remediation can be expedited and automatically implemented. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the TESD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TESD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TESD 202, the server devices 204(1)-204(n), or the client devices 208(1)-208(n), for example, may be configured to operate as virtual instances on the same physical machine. For example, one or more of the TESD 202, the server devices 204(1)-204(n), or the client devices 208(1)-208(n) may operate on the same physical device rather than as separate devices communicating through communication network(s) 210. Additionally, there may be more or fewer TESDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
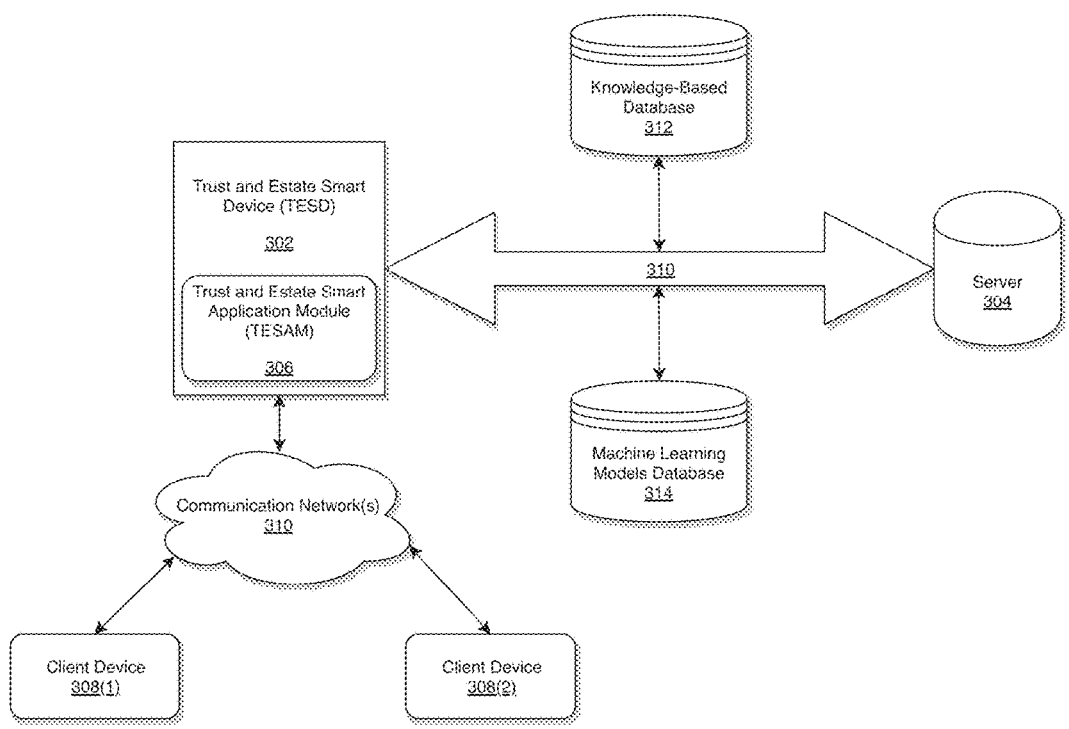
FIG. 3 illustrates a system diagram for implementing a trust and estate smart device with a trust and estate smart application module in accordance with an exemplary embodiment.

FIG. 3 illustrates a system diagram for implementing a trust and estate smart device (TESD) with a trust and estate smart application module (TESAM) in accordance with an exemplary embodiment.

As illustrated in FIG. 3, the TESD 302 including the TESAM 306 may be connected to a server 304, a knowledge-based database 312, and a machine learning models database 314 via a communication network 310. The TESD 302 may also be connected to a first client device 308(1) and a second client device 308(2) via the communication network 310, but the disclosure is not limited thereto. According to exemplary embodiments, the machine learning models may be trained using CPUs and GPUs, but the disclosure is not limited thereto.

According to exemplary embodiment, the TESD 302 is described and shown in FIG. 3 as including the TESAM 306, although it may include other rules, policies, modules, databases, or applications, for example. According to exemplary embodiments, the knowledge-based database 312 and the machine learning models database 314 may be embedded within the TESD 302. According to exemplary embodiments, the knowledge-based database 312 may be configured to store information including: rules and heuristics relating to trust and estate; vocabularies for language models in the field of trust and estate; entities, facts, and events that drive provisions of a trust and estate document; look-up tables having vocabularies related to trust and estate; and information relating to trust and estate training data collection, but the disclosure is not limited thereto. According to exemplary embodiments, the machine learning models database 314 may be configured to store classification models which may include: an auxiliary model that identifies whether a sentence extracted from the digitized data relates to an entity or an event governing a trust and estate document; a sentence detection model that identifies whether a sentence extracted from the digitized data is a complete sentence; and a fragment detection model that identifies whether a sentence extracted from the digitized data is an incomplete sentence or a heading, but the disclosure is not limited thereto. According to exemplary embodiments, the TESAM 306 may be configured to make domain specific optical character recognition corrections to the digitized data.

According to exemplary embodiments, the TESAM 306 may be configured to receive continuous feed of data from the knowledge-based database and 312 and the machine learning models database 314 via the communication network 310.

As will be described below, the TESAM 306 may be configured to automatically receive, digitized data of a document having unstructured data format; apply machine learning models accessed from the machine learning models database 314 for sectioning the digitized data for making domain specific optical character recognition (OCR) corrections and determining pertinent portions; apply OCR processing to the sectioned digitized data by utilizing an OCR device (not shown); match the sectioned digitized data to patterns and rules accessed from the knowledge-based database 312 and applying extraction modules to extract text that correspond to a taxonomy code; apply classification models accessed from the machine learning models database 314 to the matched digitized data to identify entities and events from the sectioned digitized data; automatically link each entity with corresponding event in a hierarchical format to generate a document having structured data format (see, e.g., FIG. 11); and output the document having the structured data with metadata (i.e., structured metadata) having the linked entity with corresponding event in the hierarchical format to downstream applications installed, e.g., in the first client device 308(1) and second client device 308(2) that automatically triggers execution of multiple platforms of the downstream applications that support trust and estate administration. According to exemplary embodiments, aside from classification models, the TESAM 306 may also be configured to apply entity linking models and algorithms, entity disambiguation models and algorithms.

The first client device 308(1) and the second client device 308(2) are illustrated as being in communication with the TESD 302. In this regard, the first client device 308(1) and the second client device 308(2) may be "clients" of the TESD 302 and are described herein as such. Nevertheless, it is to be known and understood that the first client device 308(1) and/or the second client device 308(2) need not necessarily be "clients" of the TESD 302, or any entity described in association therewith herein. Any additional or alternative relationship may exist between either or both of the first client device 308(1) and the second client device 308(2) and the TESD 302, or no relationship may exist.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(2) may communicate with the TESD 302 via broadband or cellular communication. Of course, these embodiments are merely exemplary and are not limiting or exhaustive.

Figure 4:
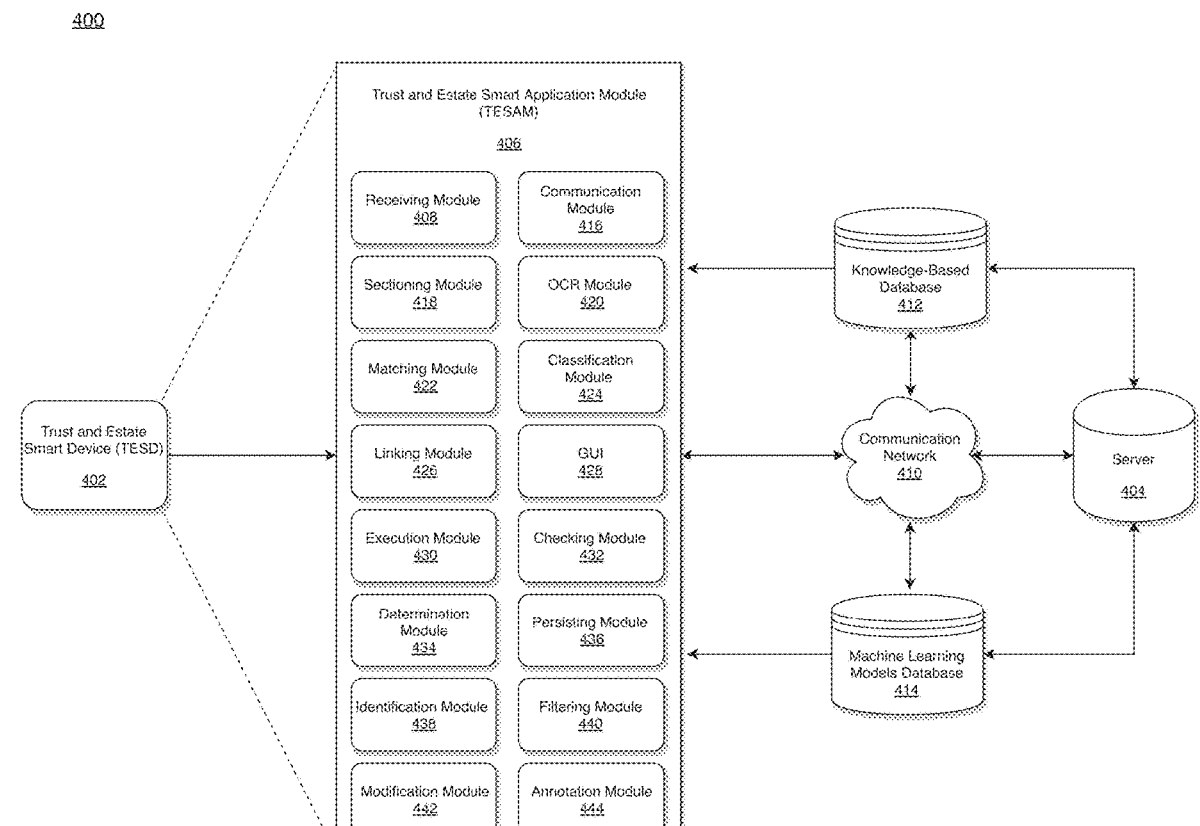
FIG. 4 illustrates a system diagram for implementing a trust and estate smart application module of FIG. 3 in accordance with an exemplary embodiment.

FIG. 4 illustrates a system diagram for implementing a trust and estate smart application module of FIG. 3 in accordance with an exemplary embodiment. As illustrated in FIG. 4, the system 400 may include a TESD 402 within which a TESAM 406 may be embedded, a knowledge-based database 412, a machine learning models database 414, a server 404, and a communication network 410.

As illustrated in FIG. 4, the TESAM 406 may include a receiving module 408, a communication module 416, a sectioning module 418, an OCR module 420, a matching module 422, a classification module 424, a linking module 426, a graphical user interface (GUI) 428, an execution module 430, a checking module 432, a determination module 434, a persisting module 436, an identification module 438, a filtering module 440, a modification module 442, and an annotation module 444. According to exemplary embodiments, the external vulnerability database 412 may be external to the TESD 402 and the TESD 402 may include various systems that are managed and operated by an organization.

The process may be executed via the communication network 410, which may comprise plural networks as described above. For example, in an exemplary embodiment, the various components of the TESAM 406 may communicate with the server 404, the knowledge-based database 412, and the Machine learning models database 414 via the communication module 416 and the communication network 410. Of course, these embodiments are merely exemplary and are not limiting or exhaustive.

According to exemplary embodiments, the communication module 416 may be configured to establish a link between the knowledge-based database 412 and the machine learning models database 414 via the communication network 410.

According to exemplary embodiments, each of the receiving module 408, the communication module 416, the sectioning module 418, the OCR module 420, the matching module 422, the classification module 424, the linking module 426, the execution module 430, the checking module 432, the determination module 434, the persisting module 436, the identification module 438, the filtering module 440, the modification module 442, and the annotation module 444 may be implemented by microprocessors or similar, they may be programmed using software (e.g., microcode) to perform various functions discussed herein and may optionally be driven by firmware and/or software. Alternatively, each of the receiving module 408, the communication module 416, the sectioning module 418, the OCR module 420, the matching module 422, the classification module 424, the linking module 426, the execution module 430, the checking module 432, the determination module 434, the persisting module 436, the identification module 438, the filtering module 440, the modification module 442, and the annotation module 444 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 408, the communication module 416, the sectioning module 418, the OCR module 420, the matching module 422, the classification module 424, the linking module 426, the execution module 430, the checking module 432, the determination module 434, the persisting module 436, the identification module 438, the filtering module 440, the modification module 442, and the annotation module 444 may be physically separated into two or more interacting and discrete blocks, units, devices, and/or modules without departing from the scope of the inventive concepts.

According to exemplary embodiments, the receiving module 408 may be configured to receive digitized data of a document having unstructured data format. The digitized data may be received from various data sources from the server 404 via the communication module 416 and the communication networks. Exemplary data sources may include any document repositories, but not limited thereto.

According to exemplary embodiments, the knowledge-based database 412 may be operatively connected to TESAM 406 and the receiving module 408 via the communication network 410 and the communication module 416.

According to exemplary embodiments, the sectioning module 418 may be configured to apply machine learning models accessed from the machine learning models database 414 for sectioning the digitized data and the OCR module 420 may be configured to apply optical character recognition (OCR) processing to the sectioned digitized data provided by the sectioning module 418. According to exemplary embodiments, the OCR module 420 may be configured to digitize the received data, preserve format, recognize document/data structure, and recognize various document types and styles. Further, according to exemplary embodiments, the filtering module 440 may be configured to apply common preprocessing filtering algorithm to clean up OCR'ed data to remove redundant and unnecessary characters. According to exemplary embodiments, the sectioning module 418 may be further configured to apply known segmentation techniques for sectioning the received digitized document. For example, the sectioning module 418 may be further configured to apply keyword-based segmentation techniques for sectioning the received digitized document, but the disclosure is not limited thereto.

According to exemplary embodiments, the matching module 422 may be configured to match the sectioned digitized data to patterns and rules accessed from the knowledge-based database 412 and the classification module 424 may be configured to apply classification models accessed from the machine learning models database 414 to the matched digitized data to identify entities and events from the sectioned digitized data, but the disclosure is not limited thereto. According to exemplary embodiments, the classification models may be in-document classification models, and besides the in-document classification models, the TESAM 406 may be configured to apply extraction models, disambiguation models, and linking models for the purpose of matching and comparing and other preprocessing and post processing of the digitized data.

According to exemplary embodiments, the identification module 438 may be configured to identify the entities and events from the sectioned digitized data after application of the in-document classification models (or extraction models, disambiguation models, and linking models by the classification module 424.

For example, the matching module 422 may first parse for entities from the digitized document and the identification module 438 may identify these entities. After that, the matching module 422 may parse for events or drivers that either change these entities or part these or provisions to interpret the document (e.g., a trust and estate contract) which may ultimately drive transactions downstream. For example, if the receiving module 408 receives digitized data from three trusts, the identification module 438 may identify these three entities using the above-described algorithm. After identifying the entities, the annotation module 444 may be configured to annotate everything about these entities by enumerating all the events that are found on those entities, e.g., when the trust was created, then the grantor dies, etc. all these are annotated and output a list of significant events that drive the life of the trust, e.g., when the trust was created, a death of a grantor, a death of a beneficiary, age attainment of a beneficiary. After the annotation module 444 annotates that, the matching module 422 parse through each event and to each event list the parties and provisions and powers of the parties that are relevant to that event, because a beneficiary one event may not be a beneficiary in another event . . . .

According to exemplary embodiments, the matching module 422 and the classification module 424, in combination operations, may be configured to extract both party-based information and entity-based information.

According to exemplary embodiments, the party-based information may include, but not limited thereto, the role of the party, e.g., John is the grantor, John is beneficiary, etc. Another party-based information may be authority of a party as stipulated in a contract, e.g., a party may have authority to amend the contract, to revoke, and have power of distribution, e.g., discretionary, mandatory, or otherwise. For example, according to mandatory distribution provision, a trustee may distribute to or for the benefit of the named beneficiary during the named beneficiary's lifetime all the net income from the trust estate in convenient installments but no less frequently than quarter annually. For example, according to discretionary distribution provision, in making a determination concerning discretionary principal distributions, a trustee may take into account that the welfare and support of the named beneficiary are the most important goal of this trust, even to the extent of exhausting the entire principal, with the preservation and building of wealth for the remainder beneficiaries of secondary importance.

According to exemplary embodiments, the entity-based information may include, but not limited thereto, provisions. Some provisions could be entity based and some provisions could be party-based as well. That is the data model in accordance with an exemplary embodiments and how it is annotated. For example, FIG. 7 illustrates a table listing parties and power associated with each party in accordance with an exemplary embodiment as provided by the annotation module 444. As illustrated in FIG. 7, according to exemplary embodiment, a party can assign a delegate or agent or power of attorney to assume their authorities expressed in the governing instrument. According to exemplary embodiments, a successor may typically be a trustee or a co-trustee or an executor or a co-executor or a protector that is granted their powers upon a significant event, e.g., typically the death of another party. Further, according to exemplary embodiments, powers may be granted to parties in a trust agreement and may change as a result of an event, which may be matched by the matching module 422, identified by the identification module 438, and annotated by the annotation module 444.

FIG. 8 illustrates a table listing party demographics in accordance with an exemplary embodiment. As illustrated in FIG. 8, significant events in the file of a trust may be driven by natural occurrences to the associated parties and multiple age attainment dates may be required which may be identified by the identification module 438 and annotated by the annotation module 444.

FIG. 9 illustrates a table listing party entitlements in accordance with an exemplary embodiment. As illustrated in FIG. 9, the occurrence of a significant event may add, change, or remove a beneficiary's distribution entitlement. Further, income and principal distributions may be identified as either mandatory or discretionary in the provisions of a trust which may differ for each beneficiary which may be identified by the identification module 438 and annotated by the annotation module 444.

FIG. 10 illustrates a table listing trust provisions in accordance with an exemplary embodiment which may be matched by the matching module 422, identified by the identification module 438, and annotated by the annotation module 444. As illustrated in FIG. 10, provisions may define rules by which the trustee is to act, including it may relate to the disposition of assets. In addition, standards may change as a result of a significant event, typically death or age attainment. According to exemplary embodiments, there may be multiple standards for each provision which may be matched by the matching module 422, identified by the identification module 438, and annotated by the annotation module 444.

According to exemplary embodiments, after annotating all the events associated with one entity, the annotation module 444 may then annotate the next entity in a similar manner described above with respect to FIGS. 4 and 7-10.

According to exemplary embodiments, the linking module 426 may be configured to automatically link each entity with corresponding event in a hierarchical format to generate a document having structured data format. An exemplary structured data format has been illustrated in FIG. 11.

According to exemplary embodiments, the TESAM 406 may be configured to output the document having the structured data with metadata having the linked entity with corresponding event in the hierarchical format to downstream applications and the execution module 430 may be configured to automatically trigger execution of multiple platforms of the downstream applications that support trust and estate administration. Output results may be displayed by the GUI 428.

Figure 5:
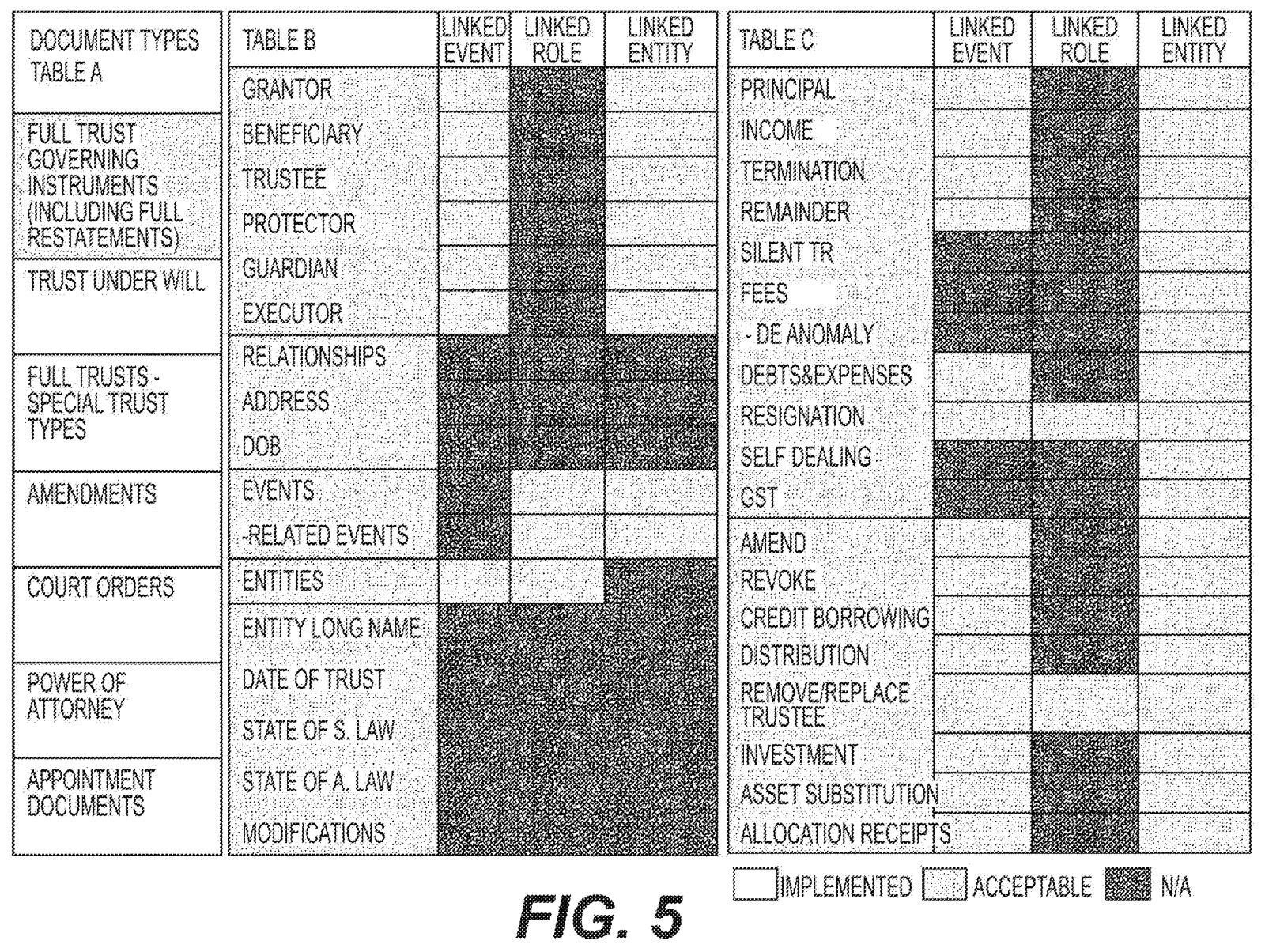

According to exemplary embodiments, FIG. 5 illustrates tables having linked and hierarchical data linked by the linking module 426 in accordance with an exemplary embodiment.

FIG. 6 illustrates a table listing definitions of taxonomy codes in accordance with an exemplary embodiment. According to exemplary embodiments, the TESAM 406 may be configured to apply the machine learning models to extract taxonomy codes as applied to the document. According to exemplary embodiments, the taxonomy codes may include roles, interested parties, powers or authority associated with a party or a role, and provisions relating to trust and estate, which may be matched by the matching module 422, identified by the identification module 438, and annotated by the annotation module 444, but the disclosure is not limited thereto.

Figure 11:
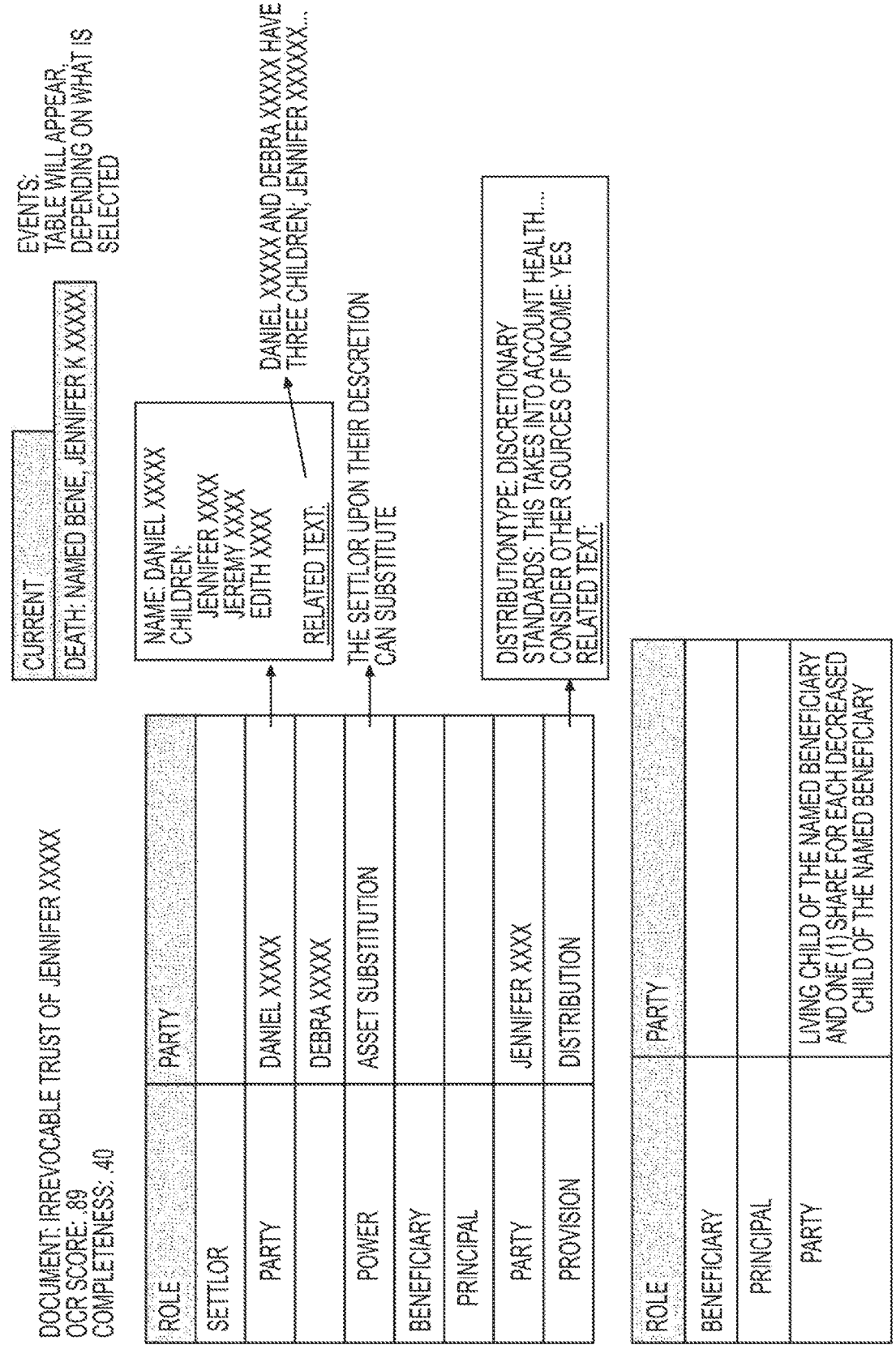
FIG. 11 illustrates a structured document generated by utilizing a trust and estate application module in accordance with an exemplary embodiment.

According to exemplary embodiments, FIG. 11 illustrates a structured document generated by utilizing a trust and estate application module TESAM 406 in accordance with an exemplary embodiment. FIG. 12 illustrates a table listing scores in accordance with an exemplary embodiment that may be output by the GUI 428. FIG. 13 illustrates an application showing results from extracting data from a sample trust document in accordance with an exemplary embodiment that may be output by the GUI 428. FIG. 14 illustrates another application showing results from extracting data from a sample trust document in accordance with an exemplary embodiment that may be output by the GUI 428. FIG. 15A illustrates a table listing scores in accordance with an exemplary embodiment that may be output by the GUI 428. FIG. 15B also illustrates a table listing scores in accordance with an exemplary embodiment that may be output by the GUI 428.

According to exemplary embodiments, the machine learning models database 414 may also include training data, dependency parse models, word vectors, named entity recognition models, entity extraction models, classification models, document segmentation models, etc., but the disclosure is not limited thereto.

According to exemplary embodiments, the TESAM 406 may be configured to apply patterns and rules from knowledge base lookup tables (e.g., dictionaries) stored in the knowledge-based database 412; vocabularies stored in the knowledge-based database 412 related to mortgage, trust and estates, but the disclosure is not limited thereto. For example, in the trust and estate scenario, issue may mean one's child. Thus, the matching module 422 may be configured to match the vocabularies. For example, in extracting data from the digitized document, regarding rules for beneficiary, the TESAM 406 may be configured to read a line "the investment distribution advisor is John." In that scenario, the TESAM 406 may be configured to just look at the name of the roles. Also, the name of the roles may be defined by a line of business, e.g., the trust investment distribution advisor might be investment advisor in another line of business. The TESAM 406 may be configured to define those roles and the matching module 422 may be configured to apply the matching algorithm described above to match those roles. Other patterns and rules may come from reading the vocabularies like, pay, give, loan, distribute, something in this line. After that, the TESAM 406 may be configured to utilize the dependency parse model accessed from the machine learning models database 414 to identify whether the beneficiary is an actual beneficiary or not as defined by the roles. Thus, any false positive may be discarded by applying the above-noted dependency parse model. For example, auxiliary models (e.g., classification models) may be utilized to identity whether the sentence relates to the beneficiary. To classify whether the sentence is relevant or not, another auxiliary model may be utilized to identify what type of sentence this is—is this a full sentence? is this a heading? is this the complete sentence? etc. For the auxiliary models may include, but not limited thereto, e.g., sentence detection model, fragment detection model, etc.

After classifying the sentence, the TESAM 406 may be configured to apply the dependency parse model accessed from the machine learning models database 414 to identify/ get the parts of speech and after that identify/get the parts of speech, and then the object, and then post filtering is applied by the filtering module 440 to filter, for example, for beneficiary it allows people, organization, and relationship (e.g., daughter, son, husband, wife, etc.). After that, the TESAM 406 may be configured to apply another model (e.g., a post filtering model) accessed from the machine learning models database 414 to detect whether it is a junk word or not due to low OCR quality (because sometimes OCR may return random stuffs) and generates attributes. For example, FIG. 12 illustrates a table listing scores in accordance with an exemplary embodiment generated by the TESAM 406.

FIG. 13 illustrates an application showing results from extracting data from a sample trust document in accordance with an exemplary embodiment as generated by the TESAM 406 and FIG. 14 illustrates another application showing results from extracting data from a sample trust document in accordance with an exemplary embodiment as generated by the TESAM 406.

According to exemplary embodiments, prior to match, the checking module 432 may be configured to: check metadata of the received digitized data of the document and the determination module 434 may be configured to determine whether the digitized data has been processed previously, and based on a positive determination, the TESAM 406 may be configured to extract previously processed rules and heuristics associated with the metadata.

According to exemplary embodiments, the receiving module 408 may be configured to receive a plurality of trust and estate documents and for each trust and estate document, the TESAM 406 may be configured to: simultaneously process the plurality of trust and estate documents; automatically generating a structured data that indicates a linkage between each entity and its associated event for each trust and estate document; and automatically triggering execution of a plurality of platforms of downstream applications that support trust and estate administration.

According to exemplary embodiments, the receiving module 408 may be configured to receive information on any changes across all documents resulting due to court orders or amendments, or any document that changes the nature of the trust and/or estate. According to exemplary embodiments, the TESAM 406 may be configure to identify and consolidate those changes to generate the latest and the most accurate data that may correspond to roles, powers, and provisions, etc., but the disclosure is not limited thereto.

According to exemplary embodiments, the TESAM 406 may be further configured to: apply the machine learning models to extract taxonomy codes as applied to the document, and wherein the taxonomy codes may include roles, interested parties, powers or authority associated with a party or a role, and provisions relating to trust and estate, but the disclosure is not limited thereto.

According to exemplary embodiments, the persisting module 436 may be further configured to: persist all entities from the metadata; for each entity, persist all events relating to the corresponding entity; for each event, persist all parties relating to the corresponding event; for each party, persist all powers associated with the corresponding party; persist all provisions associated to each entity and all the entity attributes. According to exemplary embodiments, the TESAM 406 may be configured to automatically transform all persisted data into queryable format and store the transformed data into a that is queryable by the downstream applications installed on the client devices 308(1), 308(2).

According to exemplary embodiments, the TESAM 406 may be configured to apply entity linking and entity disambiguation, but the disclosure is not limited thereto. For example, contract or trust document may be structured in such a way that in some document it may not say death of John, instead it might say death of grantor or it might say death of my daughter. Thus, in order to improve efficiency in identification, the TESAM 406 may be configured to specifically relate names (or organizations) to relationships and to roles. For example, initially, the TESAM 406 may be configured to simply parse all the names from the document, and then for each name, the TESAM 406 may be configured to parse relationship with respect to the grantor. For example, the TESAM 406 might read Carol is the wife of John or Carol is the wife of grantor. Then, the TESAM 406 may be configured to create dictionaries (e.g., lookup tables) for documents for names and associated roles. For example, one lookup table dictionary may include the names and all the roles associated with the names. Another dictionary lookup table may include the roles, and for each role all the names associated with the roles. Another dictionary lookup table may include all the relationships and all the names associated with the relationships, but the disclosure is not limited thereto. According to exemplary embodiments, the TESAM 406 may be configured to use machine learning techniques to perform entity linking and entity disambiguation and may also use external knowledge sources.

According to exemplary embodiments, the TESAM 406 may be configured to generate entity/event linking that identifies each party or each provision belonging to that event or belonging to that entity by utilizing a series of helper models or utilizing inherent legal document structure accessed from the machine learning models database 414 as disclosed above. For example, first the identification module 438 may identify a section in the received digitized document received by the receiving module 408, and then the identification module further identifies section heading or sometimes even just keywords. For example, the section heading may include: section 1: during my lifetime or Section 2: on my death. According to exemplary embodiments, the TESAM may be configured to deconstruct the section heading by assigning numbers to the sections. For example, when the sectioning module 418 returns a candidate event, e.g., "Upon My Death," the sectioning module 418 first number that and then any paragraph or any section below that should belong to that event until the sectioning module 418 returns another change of context (meaning hit another candidate event "During the Life of my Son", etc.).

According to exemplary embodiments, the taxonomy structure may be defined by the following:
1. Main Instrument Information
   a. Entity Long Name
   b. Date of Trust
   c. State of Administrative Law
   d. State of Substantive Law
   e. Modifications
2. Events
   a. Entities in that event
   i. Roles that are 'active' in that Event
     1. Parties associated with that Role
       a. Party Biographical Information
       b. Party Power
   ii. Provisions applicable to that Entity in that Event
   b. Related Events According to exemplary embodiments, for entities, first all the entities from the digitized document received by the receiving module 408 may be identified by the identification module 438 (which is different than how it was done for section linking to event). For example, for a marital trust, a common event usually involves the wife. So, any event that says My wife's death, the TESAM 406 may be configured to automatically put this event in a marital trust. Similarly, if the received document is a child's trust, there are certain events that are more often than not occurring in those specific entities. The TESAM 406 may be configured to distinguish these entities (e.g., martial trust, child trust, etc.) and accurately list them in appropriate table. According to exemplary embodiments, the TESAM 406 may be configured to capture not just parties in relation to an event but also hierarchy among parties—i.e. family tree.

According to exemplary embodiments, for downstream applications, the TESAM 406 may be configured to allow users to use enhanced metadata generated by the TESAM 406 in a manner desirable to them. For example, the client devices 308(1), 308(2) may be configured to automatically query the enhanced metadata to query for names, the data for party based or entity-based applications etc. Other downstream applications would be to automatically obtain trust profile which may be entity based. In addition, according to exemplary embodiments, the enhanced metadata may be sent to another system that may utilize the enhanced data to query for names in party-based downstream applications. Other application might be to utilize the enhanced metadata to automatically profile trust, e.g., marital trust, child trust, etc.

According to exemplary embodiments, the modification module 442 may be configured to utilize data aggregation to modify the received structured data format. For example, some data in system may be incomplete or stale. Thus, the modification module 442 may be configured to run all the documents and a trust administrator may compare those to the enhanced metadata by utilizing the client device 308(1), 308(2) so that the modification module may modify the enhanced metadata if it needs correction based on running all the documents and receiving correction inputs from the client device 308(1), 308(2).

According to exemplary embodiments, the receiving module 408 may be configured to receive all the original documents as well as amended documents associated with the original document.

According to exemplary embodiments, when a certain event occurs, the TESAM 406 may be configured to output the enhanced metadata that may automatically trigger multiple platforms that supports the trust and estate administration, thereby completely automating the entire trust and estate administration compared to conventional trust and estate administration.

According to exemplary embodiments, a non-transitory computer readable medium may be configured to store instructions for implementing the TESAM 406 for automatically extracting information from unstructured data. According to exemplary embodiments, the instructions, when executed, may cause a processor embedded within the TESAM 406 or the TESD 402 to perform the following: receiving digitized data of a document having unstructured data format for making domain specific corrections to the digitized data; applying machine learning models for sectioning the digitized data; applying optical character recognition (OCR) processing to the sectioned digitized data by utilizing an OCR device; matching the sectioned digitized data to patterns and rules accessed from a knowledge-based database; applying classification models to the matched digitized data to identify entities and events from the sectioned digitized data; automatically linking each entity with corresponding event in a hierarchical format to generate a document having structured data format; and outputting the document having structured metadata having the linked entity with corresponding event in the hierarchical format to downstream applications that automatically triggers execution of multiple platforms of the downstream applications that support trust and estate administration. The processor may be the same or similar to the processor 104 as illustrated in FIG. 1 or the processor embedded within TESD 202, TESD 302, TESD 402, and TESAM 406.

According to exemplary embodiments, the instructions, when executed, may further cause the processor 104 to perform the following prior to matching: checking metadata of the received digitized data of the document by determining whether the digitized data has been processed previously, and based on a positive determination, extracting previously processed rules and heuristics associated with the metadata.

According to exemplary embodiments, the instructions, when executed, may further cause the processor 104 to receive a plurality of trust and estate documents, and for each trust and estate document, the instructions, when executed, may further cause the processor 104 to perform the following: simultaneously processing the plurality of trust and estate documents; automatically generating a structured data that indicates a linkage between each entity and its associated event for each trust and estate document; combining and automatically triggering execution of a plurality of platforms of downstream applications that support trust and estate administration.

According to exemplary embodiments, the instructions, when executed, may further cause the processor 104 to obtain information on any changes across all documents resulting due to court orders or amendments, or any document that changes the nature of the trust and/or estate. According to exemplary embodiments, the instructions, when executed, may further cause the processor 104 to identify and consolidate those changes to generate the latest and the most accurate data that may correspond to roles, powers, and provisions, etc., but the disclosure is not limited thereto.

According to exemplary embodiments, the instructions, when executed, may further cause the processor 104 to perform the following: persisting all entities from the metadata; for each entity, persisting all events relating to the corresponding entity; for each event, persisting all parties relating to the corresponding event; for each party, persisting all powers associated with the corresponding party, persisting all provisions associated to each entity and all the entity attributes; persisting all parties associated with the provisions; transforming all persisted data into queryable format; and storing the transformed data into a database that is queryable by the downstream applications.

Figure 16:
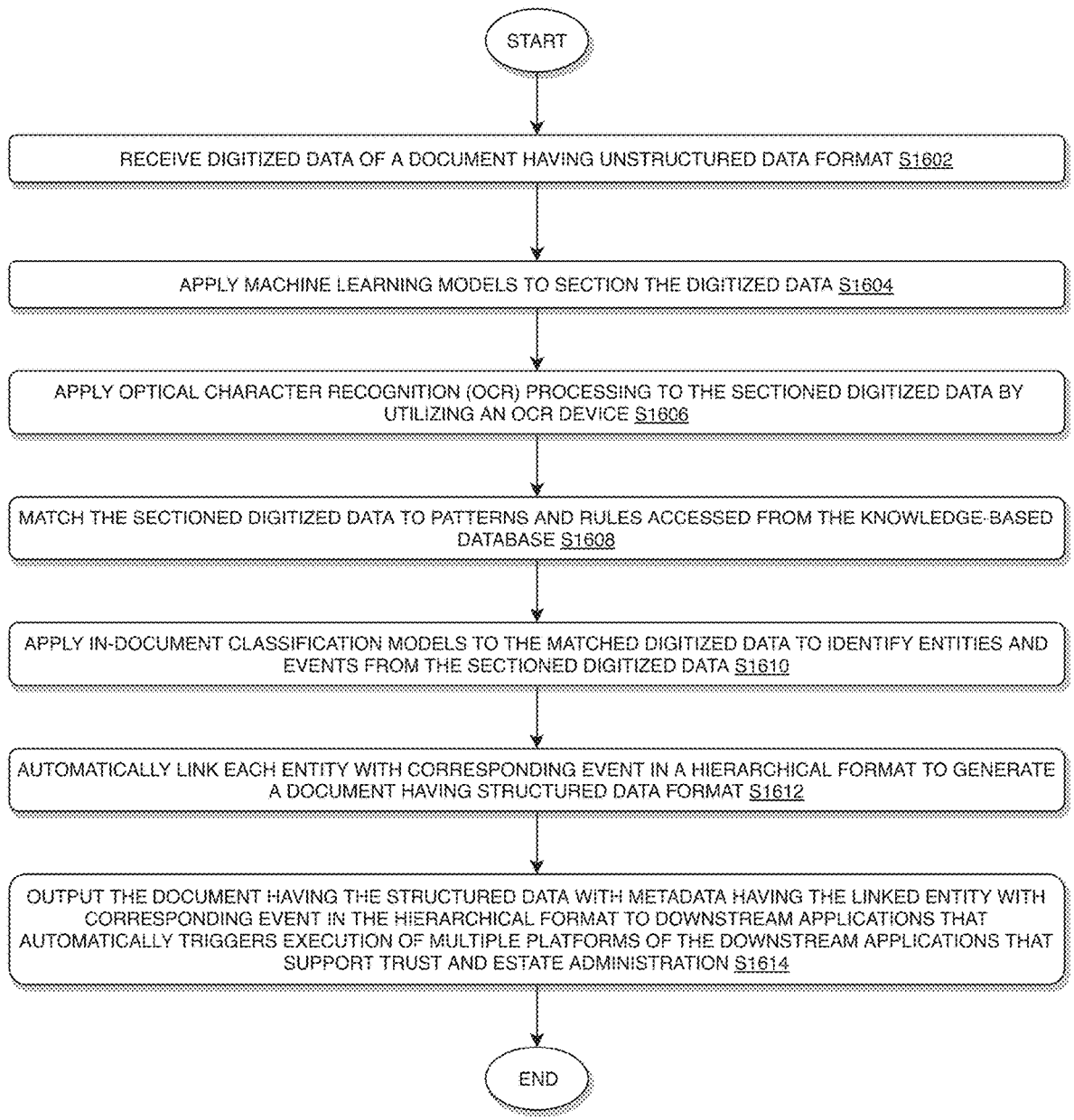
FIG. 16 illustrates a flow chart for implementing a trust and estate smart application module in accordance with an exemplary embodiment.

FIG. 16 illustrates a flow chart for implementing a trust and estate smart application module for automatically extracting information from unstructured data by utilizing one or more processors and one or more memories in accordance with an exemplary embodiment.

In the process 1600 of FIG. 16, at step S1602, digitized data of a document having unstructured data format may be received. At step S1604, machine learning models for sectioning the digitized data may be applied. At step S1606, optical character recognition (OCR) processing to the sectioned digitized data may be applied by utilizing an OCR device (not shown). At step S1608, the sectioned digitized data may be matched to patterns and rules accessed from a knowledge-based database. At step S1610, classification models may be applied to the matched digitized data to identify entities and events from the sectioned digitized data. At step S1612, each entity may be automatically linked with corresponding event in a hierarchical format to generate a document having structured data format. At step S1614, the document having the structured data with metadata having the linked entity with corresponding event in the hierarchical format may be automatically outputted to downstream applications, thereby automatically triggering execution of multiple platforms of the downstream applications that support trust and estate administration.

According to exemplary embodiments, prior to matching, the process 1600 may further include: checking metadata of the received digitized data of the document by determining whether the digitized data has been processed previously; and based on a positive determination, extracting previously processed rules and heuristics associated with the metadata.

According to exemplary embodiments, the process 1600 may further include receiving a plurality of trust and estate documents, and for each trust and estate document, the process 1600 may further include: simultaneously processing the plurality of trust and estate documents; automatically generating a structured data that indicates a linkage between each entity and its associated event for each trust and estate document; and automatically triggering execution of a plurality of platforms of downstream applications that support trust and estate administration.

According to exemplary embodiments of the process 1600, the knowledge-based database may be configured to store information including: rules and heuristics relating to trust and estate; vocabularies for language models in the field of trust and estate; entities, facts, and events that drive provisions of a trust and estate document; look-up tables having vocabularies related to trust and estate; and information relating to trust and estate training data collection, but the disclosure is not limited thereto.

According to exemplary embodiments, the process 1600 may further include: applying the machine learning models to extract taxonomy codes as applied to the document, wherein the taxonomy codes includes roles, interested parties, powers or authority associated with a party or a role, and provisions relating to trust and estate and relating to parties, but the disclosure is not limited thereto.

According to exemplary embodiments of the process 1600, the in-document classification models may include: an auxiliary model that identifies whether a sentence extracted from the digitized data relates to an entity or an event governing a trust and estate document; a sentence detection model that identifies whether a sentence extracted from the digitized data is a complete sentence; and a fragment detection model that identifies whether a sentence extracted from the digitized data is an incomplete sentence or a heading, but the disclosure is not limited thereto.

According to exemplary embodiments, the process 1600 may further include: persisting all entities from the metadata; for each entity, persisting all events relating to the corresponding entity, for each event, persisting all parties relating to the corresponding event; for each party, persisting all powers associated with the corresponding party; persisting all provisions associated to each entity and all the entity attributes; transforming all persisted data into queryable format; and storing the transformed data into a database that is queryable by the downstream applications.

According to exemplary embodiments, the process 1600 may include obtaining information on any changes across all documents resulting due to court orders or amendments, or any document that changes the nature of the trust and/or estate. According to exemplary embodiments, the process 1600 may further include identifying and consolidating those changes to generate the latest and the most accurate data that may correspond to roles, powers, and provisions, etc., but the disclosure is not limited thereto.

According to exemplary embodiments as disclosed above in FIGS. 1-16, technical improvements effected by the instant disclosure may include platforms for implementing a trust and estate smart application module for automatically extracting information from unstructured data and automatically generating a structured data based on the extracted information thereby automatically triggering execution of multiple platforms of a downstream applications that support trust and estate administration, but the disclosure is not limited thereto. In addition, according to exemplary embodiments as disclosed above in FIGS. 1-16, technical improvements effected by the instant disclosure may include platforms for implementing a trust and estate smart application module for automatically extracting hierarchical information of data from unstructured data to generate an structured data having limited data set compared to unstructured data using natural language processing techniques and machine learning models in a very short amount of time, i.e., within seconds, and to automatically drive trust administration which overcomes the above-described deficiencies and shortcomings, but the disclosure is not limited thereto. Further, according to exemplary embodiments as disclosed above in FIGS. 1-16, technical improvements effected by the instant disclosure may include summarizing the contents of unstructured data into a significantly reduced structured data file that helps lower the storage requirements of a database.

According to exemplary embodiments, the document is not limited to trust and estate document. The document may be related to any structured or unstructured document, e.g., legal contracts, forms, etc.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a trust and estate smart application module for automatically extracting information from unstructured data by utilizing one or more processors and one or more memories, the method comprising:
   receiving digitized data of a document having unstructured data format;
   applying machine learning models for sectioning the digitized data;
   applying optical character recognition (OCR) processing to the sectioned digitized data by utilizing an OCR device;
   matching the sectioned digitized data to patterns and rules accessed from a knowledge-based database;
   applying classification models to the matched digitized data to identify entities and events from the sectioned digitized data;
   automatically linking each entity with corresponding event in a hierarchical format to generate a document having structured data format; and
   outputting the document having the structured data with metadata having the linked entity with corresponding event in the hierarchical format to downstream applications;
   receiving a plurality of trust and estate documents, and for each trust and estate document:
      simultaneously processing the plurality of trust and estate documents;
      interpreting contents of each document having the unstructured data format in a way that would translate it into the document having the structured data format regarding provisions, parties, and events detailed in the unstructured data;
      automatically generating the structured data that indicates a linkage between each entity and its associated event for each trust and estate document; and
      automatically triggering execution of a plurality of platforms of downstream applications that support trust and estate administration.

2. The method according to claim 1, wherein prior to matching, the method further comprising:
   checking metadata of the received digitized data of the document by determining whether the digitized data has been processed previously; and
   based on a positive determination, extracting previously processed rules and heuristics associated with the metadata.

3. The method according to claim 1, wherein the knowledge-based database is configured to store information comprising:
- rules and heuristics relating to trust and estate;
- vocabularies for language models in the field of trust and estate;
- entities, facts, and events that drive provisions of a trust and estate document;
- look-up tables having vocabularies related to trust and estate; and
- information relating to trust and estate training data collection.

4. The method according to claim 1, further comprising:
applying the machine learning models to extract taxonomy codes as applied to the document, wherein the taxonomy codes includes roles, interested parties, powers or authority associated with a party or a role, and provisions relating to trust and estate.

5. The method according to claim 1, wherein the classification models comprising:
- an auxiliary model that identifies whether a sentence extracted from the digitized data relates to an entity or an event governing a trust and estate document;
- a sentence detection model that identifies whether a sentence extracted from the digitized data is a complete sentence; and
- a fragment detection model that identifies whether a sentence extracted from the digitized data is an incomplete sentence or a heading.

6. The method according to claim 1, further comprising:
persisting all entities from the metadata;
for each entity, persisting all events relating to the corresponding entity;
for each event, persisting all parties relating to the corresponding event;
for each party, persisting all powers associated with the corresponding party;
persisting all provisions associated to each entity and all the entity attributes;
transforming all persisted data into queryable format; and
storing the transformed data into a database that is queryable by the downstream applications.

7. A system for implementing a trust and estate smart application module for automatically extracting information from unstructured data, comprising:
- a receiver configured to receive digitized data of a document having unstructured data format;
- a processor; and
- a knowledge-based database operatively connected to the processor and the receiver via a communication network, wherein the processor is configured to:
apply machine learning models to section the digitized data;
apply optical character recognition (OCR) processing to the sectioned digitized data by utilizing an OCR device;
match the sectioned digitized data to patterns and rules accessed from the knowledge-based database;
apply classification models to the matched digitized data to identify entities and events from the sectioned digitized data;
automatically link each entity with corresponding event in a hierarchical format to generate a document having structured data format;
output the document having the structured data with metadata having the linked entity with corresponding event in the hierarchical format to downstream applications;
receive a plurality of trust and estate documents, and for each trust and estate document:
- simultaneously process the plurality of trust and estate documents;
- interpret contents of each document having the unstructured data format in a way that would translate it into the document having the structured data format regarding provisions, parties, and events detailed in the unstructured data;
- automatically generate the structured data that indicates a linkage between each entity and its associated event for each trust and estate document; and
- automatically trigger execution of a plurality of platforms of downstream applications that support trust and estate administration.

8. The system according to claim 7, wherein prior to match, the processor is further configured to:
check metadata of the received digitized data of the document by determining whether the digitized data has been processed previously; and
based on a positive determination, extract previously processed rules and heuristics associated with the metadata.

9. The system according to claim 7, wherein the knowledge-based database is configured to store information comprising:
- rules and heuristics relating to trust and estate;
- vocabularies for language models in the field of trust and estate;
- entities, facts, and events that drive provisions of a trust and estate document;
- look-up tables having vocabularies related to trust and estate; and
- information relating to trust and estate training data collection.

10. The system according to claim 7, wherein the processor is further configured to apply the machine learning models to extract taxonomy codes as applied to the document, and wherein the taxonomy codes includes roles, interested parties, powers or authority associated with a party or a role, and provisions relating to trust and estate.

11. The system according to claim 7, wherein the classification models comprising:
- an auxiliary model that identifies whether a sentence extracted from the digitized data relates to an entity or an event governing a trust and estate document;
- a sentence detection model that identifies whether a sentence extracted from the digitized data is a complete sentence; and
- a fragment detection model that identifies whether a sentence extracted from the digitized data is an incomplete sentence or a heading.

12. The system according to claim 7, wherein the processor is further configured to:
persist all entities from the metadata;
for each entity, persist all events relating to the corresponding entity;
for each event, persist all parties relating to the corresponding event;
for each party, persist all powers associated with the corresponding party;
persist all provisions associated to each entity and all the entity attributes;

transform all persisted data into queryable format; and store the transformed data into a database that is queryable by the downstream applications.

13. A non-transitory computer readable medium configured to store instructions for automatically extracting information from unstructured data, wherein when executed, the instructions cause a processor to perform the following:

receiving digitized data of a document having unstructured data format;

applying machine learning models for sectioning the digitized data;

applying optical character recognition (OCR) processing to the sectioned digitized data by utilizing an OCR device;

matching the sectioned digitized data to patterns and rules accessed from a knowledge-based database;

applying classification models to the matched digitized data to identify entities and events from the sectioned digitized data;

automatically linking each entity with corresponding event in a hierarchical format to generate a document having structured data format;

outputting the document having the structured data with metadata having the linked entity with corresponding event in the hierarchical format to downstream applications;

receiving a plurality of trust and estate documents, and for each trust and estate document:

simultaneously processing the plurality of trust and estate documents;

interpreting contents of each document having the unstructured data format in a way that would translate it into the document having the structured data format regarding provisions, parties, and events detailed in the unstructured data;

automatically generating the structured data that indicates a linkage between each entity and its associated event for each trust and estate document; and automatically triggering execution of a plurality of platforms of downstream applications that support trust and estate administration.

14. The non-transitory computer readable medium according to claim 13, wherein when executed, the instructions further cause the processor to perform the following prior to matching:

checking metadata of the received digitized data of the document by determining whether the digitized data has been processed previously; and based on a positive determination, extracting previously processed rules and heuristics associated with the metadata.

15. The non-transitory computer readable medium according to claim 13, wherein when executed, the instructions further cause the processor to perform the following:

applying the machine learning models to extract taxonomy codes as applied to the document, wherein the taxonomy codes includes roles, interested parties, powers or authority associated with a party or a role, and provisions relating to trust and estate.

16. The non-transitory computer readable medium according to claim 13, wherein the classification models comprising:

an auxiliary model that identifies whether a sentence extracted from the digitized data relates to an entity or an event governing a trust and estate document;

a sentence detection model that identifies whether a sentence extracted from the digitized data is a complete sentence; and a fragment detection model that identifies whether a sentence extracted from the digitized data is an incomplete sentence or a heading.

17. The non-transitory computer readable medium according to claim 13, wherein when executed, the instructions further cause the processor to perform the following:

persisting all entities from the metadata;

for each entity, persisting all events relating to the corresponding entity;

for each event, persisting all parties relating to the corresponding event;

for each party, persisting all powers associated with the corresponding party;

persisting all provisions associated to each entity and all the entity attributes;

transforming all persisted data into queryable format; and storing the transformed data into a database that is queryable by the downstream applications.

* * * * *